United States Patent
Lin

(10) Patent No.: US 9,684,811 B2
(45) Date of Patent: Jun. 20, 2017

(54) SUSPENDED CAPACITIVE FINGERPRINT SENSOR AND METHOD FOR MANUFACTURING THE SAME

(71) Applicant: J-METRICS TECHNOLOGY Co., Ltd., Taipei (TW)

(72) Inventor: Wei-Ting Lin, Taipei (TW)

(73) Assignee: J-METRICS TECHNOLOGY CO., LTD., Taipei (TW)

( * ) Notice: Subject to any disclaimer, the term of this patent is extended or adjusted under 35 U.S.C. 154(b) by 5 days.

(21) Appl. No.: 15/044,666

(22) Filed: Feb. 16, 2016

(65) Prior Publication Data

US 2016/0275333 A1    Sep. 22, 2016

(30) Foreign Application Priority Data

Mar. 20, 2015   (TW) .............................. 104109156 A

(51) Int. Cl.
  *H01L 21/00*   (2006.01)
  *G06K 9/00*   (2006.01)
(52) U.S. Cl.
  CPC ....... *G06K 9/0002* (2013.01); *G06K 9/00053* (2013.01)
(58) Field of Classification Search
  None
  See application file for complete search history.

(56) References Cited

U.S. PATENT DOCUMENTS

| | | | |
|---|---|---|---|
| 4,053,228 A | 10/1977 | Schiller | |
| 4,340,300 A | 7/1982 | Ruell | |
| 6,512,381 B2 | 1/2003 | Kramer | |
| 7,864,992 B2 | 1/2011 | Riedijk et al. | |
| 2016/0275332 A1* | 9/2016 | Lin | G06K 9/0002 |

FOREIGN PATENT DOCUMENTS

| | | |
|---|---|---|
| CN | 1228731 | 9/1999 |
| TW | 200424950 | 12/2004 |
| TW | 200527665 | 8/2005 |
| TW | 201015452 | 4/2010 |

* cited by examiner

*Primary Examiner* — Angel Roman
(74) *Attorney, Agent, or Firm* — Andrew M. Calderon; Roberts Mlotkowski Safran Cole & Calderon, P.C.

(57) ABSTRACT

A suspended capacitive fingerprint sensor includes a substrate, capacitive sensing units disposed on the substrate and one or more insulation protection layer. Each of the capacitive sensing units includes a fixed electrode, a suspended electrode, and a chamber between the fixed electrode and the suspended electrode. The insulation protection layer covers the capacitive sensing units, so that the capacitive sensing units sense a fingerprint of a finger above the insulation protection layer. A method for manufacturing the suspended capacitive fingerprint sensor is also provided.

8 Claims, 5 Drawing Sheets

SUSPENDED CAPACITIVE FINGERPRINT SENSOR AND METHOD FOR MANUFACTURING THE SAME

CROSS-REFERENCES TO RELATED APPLICATIONS

This non-provisional application claims priority under 35 U.S.C. §119(a) on Patent Application No. 104109156 filed in Taiwan, R.O.C. on 2015/03/20, the entire contents of which are hereby incorporated by reference.

BACKGROUND

Technical Field

The instant disclosure relates to a fingerprint sensor and a method for manufacturing the fingerprint sensor, and particularly relates to a suspended capacitive fingerprint sensor and method for manufacturing the same.

Related Art

Along with the developments in semiconductor integrated circuits (IC) manufacturing processes, new capacitive fingerprint sensing chips reestablish the era for fingerprint recognition systems, and global chip manufacturers develop many press-type and slide-type fingerprint sensors gradually. Based on this new technology, electronic device manufacturers have made laptops having capacitive fingerprint sensor chips since 2000, like IBM and Dell. Also, from 2006, Asus and Acer started to sell laptops having the capacitive fingerprint sensors. However, the fingerprint recognition function is mainly utilized in business laptops and provided for replacing the boot password and for encrypting files. In addition, since the capacitive fingerprint sensors are still lack of their own specific applications, installation rates of the capacitive fingerprint sensors in laptops are hardly to be increased.

As technologies move forward, more and more electronic devices appear in our daily lives. In addition, the high speed internet century promotes the growing in mobile payment and electrical commerce, and online transactions become frequently. Therefore the importance of electronic authentication is increasing. In the existing password authentication, the passwords may be stolen, forgotten, or cracked, and users are required to change the passwords regularly. Such complicated requirements in identification (ID) and password may not only lower the willingness of customers in online transactions, but also increase risks and costs for the password authentication service providers. Consequently, to replace the conventional password authentication with a convenient and safe personal ID authentication would improve the willingness and confidence of customers in online transactions and would be positive to the developments of the mobile payment and electrical commerce.

As compared to a conventional optical recognition device, a capacitive fingerprint recognition chip is small and has the ability for identifying living things. Therefore, the capacitive fingerprint recognition chip would not be cheated by a fake finger easily. In addition, because the application of the capacitive fingerprint chips is no more restricted in governments' recognition systems, the application of fingerprint recognition in consumer electronics grows gradually in the last decade; consumer electronics including flash disks, portable hard drives, laptops, and mobile phones may have fingerprint recognition chips to protect user information. After Apple launched its iPhone 5s installed with fingerprint recognition chip in September of 2013, other mobile phone companies began to launch their devices installed with fingerprint recognition functions. Accordingly, applications of fingerprint recognition in consumer electronics became popular again. In addition, because of the rapid eruption of electrical commerce and mobile payment, fingerprint recognition chips may possibly be the standard equipments of mobile devices.

Fingerprint recognition devices are the main stream in biological recognition technologies. The conventional optical fingerprint reading methods, as disclosed in U.S. Pat. No. 4,053,228 and U.S. Pat. No. 4,340,300, are maturely developed; however, the size of the device is large and the cost of the device is not cheap.

Moreover, as disclosed in CN patent 1228731, where the inventors utilize the pressure sensor as the fingerprint sensing unit. In brief, the capacitance change between the suspended substrates is induced by using a user's finger to press the protruded blocks of the suspended substrates, so that the fingerprint of the user's finger can be recognized. However, since a human's finger is soft and the structure rigidness of a suspended substrate, with its area not exceeding than 50*50 micrometer square ($\mu m^2$), is strong, the capacitance change between the suspended substrates is quite small when the user's finger presses on such suspended substrate in a 500 dpi fingerprint resolution requirement. In addition, during operation, the finger has to directly in contact with the suspended substrate, so that the suspended substrate may be damaged easily. Moreover, the suspended substrates are not suitable in nowadays chip packaging procedures of portable electronic devices.

Because of the popularization of portable electronic devices, attentions are paid to small and light fingerprint sensors gradually, promoting the developments of capacitive fingerprint sensors. And accordingly, silicon chips are served as the fingerprint recognition chips as disclosed in U.S. Pat. No. 7,864,992 and U.S. Pat. No. 6,512,381. For a conventional sensor unit, external or internal driving signals may be applied thereto to generate signals. Specifically, a group of electrode plates made by semiconductor manufacturing processes are provided to be in contact with a user's hand, an insulation layer is covered on the electrode plates, and the electrode plates may be perpendicularly or parallel aligned with each other. Because human bodies are conductive, the finger and the electrode plates form a sensing capacitance when the finger is in contact with the electrode plates. The sensing capacitance value formed by the ridge of the finger and the electrode plates is different from that formed by the valley of the finger and the electrode plates; specifically, the capacitance value formed by the ridge and the electrode plates is greater than that formed by the valley and the electrode plates. Accordingly, the sensing capacitance is compared with a reference capacitance and a parasitic capacitance, so that a two dimensional graph of the fingerprint showing ridges and valleys can be obtained. However, the sensing capacitance value would be affected by the protection layer, i.e., the thicker the protection layer is, the smaller the sensing capacitance value becomes. In addition, if the difference between the sensing capacitance value and the reference capacitance value is too large, the signal of the fingerprint sensing unit outputted to the backend processing circuit would be reduced, lowering the sensitivity of the sensor unit.

For the fingerprint sensor application in laptops, because of the book-like appearance of the laptop, the fingerprint sensor would be protected by the cover of the laptop, allowing the thickness of the protection layer of the fingerprint sensor to be in the range of 5 to 10 $\mu m$. While for portable electronic devices, the fingerprint recognition chip is to be exposed to outside for meeting users' needs and mating with the structure of the device, consequently, in the portable electronic device, the thickness of the protection layer covering on the fingerprint recognition chip is to be increased. In conventional semiconductor manufacturing processes, the reference capacitance is formed by an insulation layer commonly made of silicon dioxide. The minimum value of the reference capacitance is $Cref=\in*A/n*d$, wherein $\in$ is the dielectric constant, A is the area of the sensing electrode, D is the thickness of the silicon dioxide layer for each layer, n is the number of the layers of the silicon dioxide layers, and the dielectric constant of the insulation layer is approximately equal to 4.

For the conventional fingerprint recognition chip, no matter the driving signal is provided by an external driving source or an internal driving source, the thickness of the protection layer, the dielectric constant of the protection layer, and the intensity of the driving signals are positively related with each other. In order to utilize thicker materials as the protection layer, some companies use a sapphire substrate as the protection layer since the dielectric constant of sapphires is about 9 to 11; while other some companies use a modified molding compound with its dielectric constant about 7 to 8 to replace the conventional molding compound. However, the cost of the sapphire substrate is expensive; in addition, the high dielectric constant molding compound is not stable, thus the defect-free rate in packaging procedures of the fingerprint would be affected adversely and easily.

SUMMARY

One object of the instant disclosure is to provide a suspended capacitive fingerprint sensor and method for making the same.

Another object of the instant disclosure is to provide a capacitive fingerprint sensor with high sensitivity. With the suspended capacitance structure, the parasitic capacitance of the sensing structure and the reference capacitance can be reduced; in addition, at least one operational amplifier is applied to gain the output signal so as to improve the output signal efficiently.

To achieve these and other objects, the instant disclosure provides a suspended capacitive fingerprint sensor. One embodiment of the suspended capacitive fingerprint sensor comprises a substrate, a plurality of capacitive sensing units on the substrate, and at least one insulation protection layer. Each of the capacitive sensing units comprises a fixed electrode, a suspended electrode, and a chamber between the fixed electrode and the suspended electrode. The insulation protection layer covers the capacitive sensing units, so that the capacitive fingerprint units sense a fingerprint of a finger above the insulation protection layer.

One embodiment of the instant disclosure further provides a method for manufacturing a suspended capacitive fingerprint sensor comprising (a) providing a sensor main structure comprising a substrate and a plurality of capacitive sensing unit main structures on the substrate, wherein each of the capacitive sensing unit main structures comprises a plurality of dielectric layers and a plurality of conductive layer alternately arranged with the dielectric layers, the conductive layers comprise an upper conductive layer, a lower conductive layer, and one or more middle conductive layer between the upper conductive layer and the lower conductive layer, the conductive layers in the non-sensing region is provided for connecting the wires of the transistors of the substrate, or for meeting the resistance and capacitance characteristics of the sensing circuits; (b) forming a first via hole on the upper conductive layer; (c) forming a silicon dioxide layer on the upper conductive layer; (d) forming a second via hole on the silicon dioxide layer, wherein the second via hole communicates with the first via hole; (e) forming a silicon nitride layer on the silicon dioxide layer; (f) forming a third via hole on the silicon nitride layer, wherein the third via hole communicates with the second via hole, and the silicon nitride layer is further formed on inner walls of the via holes; (g) etching the dielectric layers through the via holes to remove parts of the dielectric layers between the upper conductive layer and the lower conductive layer to form a chamber between the upper conductive layer and the lower conductive layer, wherein the portion of the upper conductive layer exposed to the chamber is served as a suspended electrode, and the lower conductive layer is served as a fixed electrode; and (h) covering a material filling layer on the silicon nitride layer, wherein the material filling layer seals the third via hole.

Based on the suspended capacitive fingerprint sensor of the embodiment of the instant disclosure, the parasitic capacitance and the reference capacitance are effectively reduced, so that the sensitivity is improved and the thickness of the insulation protection layer can thus be increased. Accordingly, the fingerprint sensor can be protected properly.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims and drawings in the instant disclosure.

BRIEF DESCRIPTION OF THE DRAWINGS

The disclosure will become more fully understood from the detailed description given herein accompanying by the following figures, which are illustration only, and thus not limitative of the disclosure, wherein.

DETAILED DESCRIPTION

The suspended capacitive fingerprint sensor according to embodiments of the instant disclosure comprises a plurality of capacitive sensing units. Each of the sensing units comprises a sensing capacitance structure having suspended structures (hereinafter called suspended capacitance structure). Each of the suspended capacitance structure comprises a fixed electrode and a suspended electrode, the fixed electrode is located below the suspended electrode, and a gap is defined between the fixed electrode and the suspended electrode. The fixed electrode may be made of metal composite material and may be formed by a first conductive layer of a common complementary metal-oxide semiconductor (CMOS) manufacturing process. The suspended capacitance structures may be made of metal composite material and may have at least one dielectric layer. A plurality of etching holes is defined on the suspended capacitance structure and through the suspended electrode. The etching windows commonly are filled by polymer materials or insulation materials which are commonly applied in semiconductors. For each of the sensing capacitance structures, the fixed electrode and the suspended electrode are electrically connected to two ends of an operational amplifier, respectively. Each of the operational amplifiers has a positive input end, a negative input end, and a signal output end. The suspended electrode is connected to the negative input end, and the fixed electrode is connected to the positive input end. At least one insulation protection layer is covered on the suspended electrode, so that a user's finger is indirectly in contact with the suspended electrode above the insulation protection layer. Because the aforementioned structural configurations improve the sensitivity of the fingerprint sensor, the thickness of the insulation protection layer can be at least 150 μm or greater when a conventional packaging material or a tempered glass (rather than high dielectric material) is utilized in the manufacturing of the fingerprint sensor.

Figure 1:
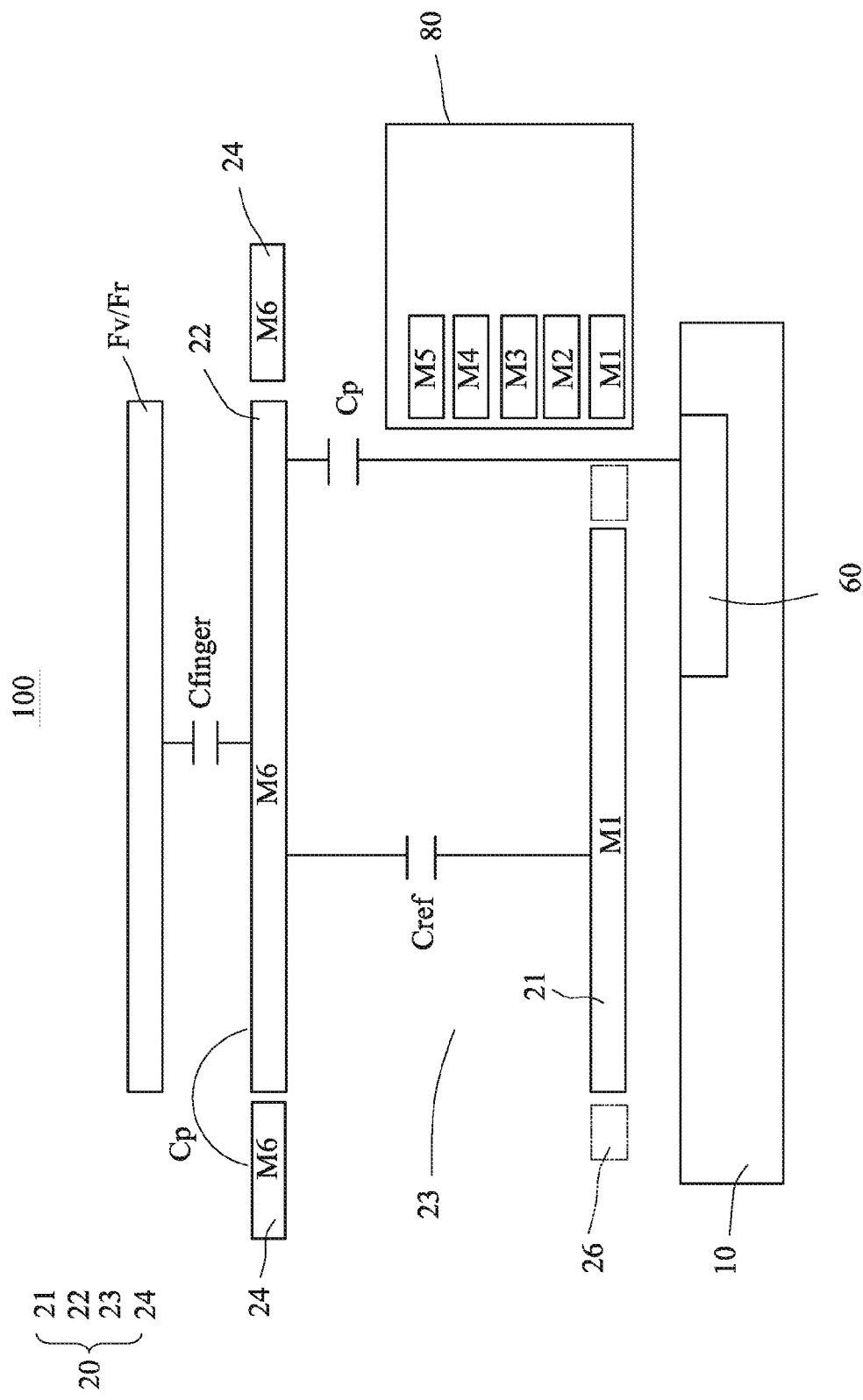
FIG. 1 illustrates a schematic view of a suspended capacitive fingerprint sensor of one embodiment of the instant disclosure.
Figure 2:
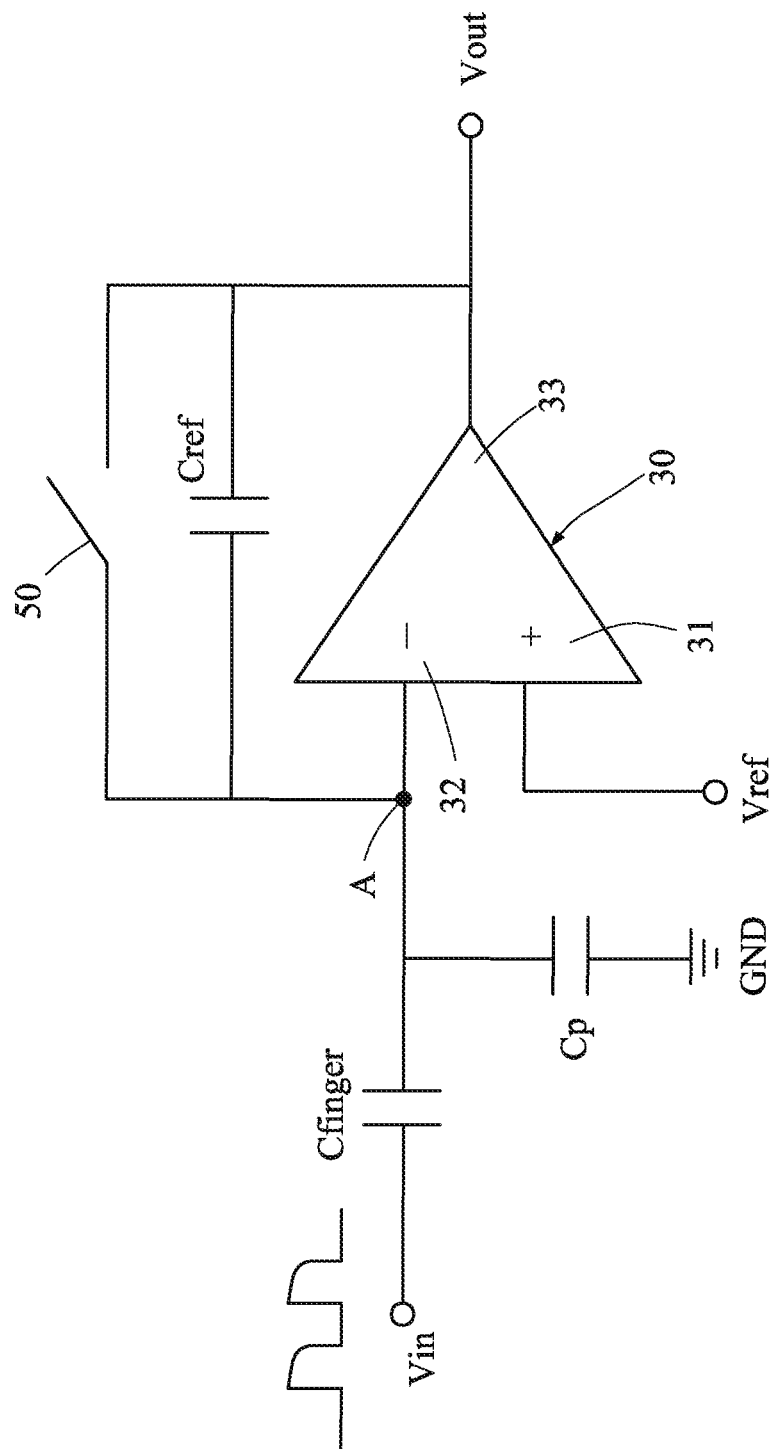
FIG. 2 illustrates a circuit diagram of the suspended capacitive fingerprint sensor of one embodiment of the instant disclosure.
Figure 3:
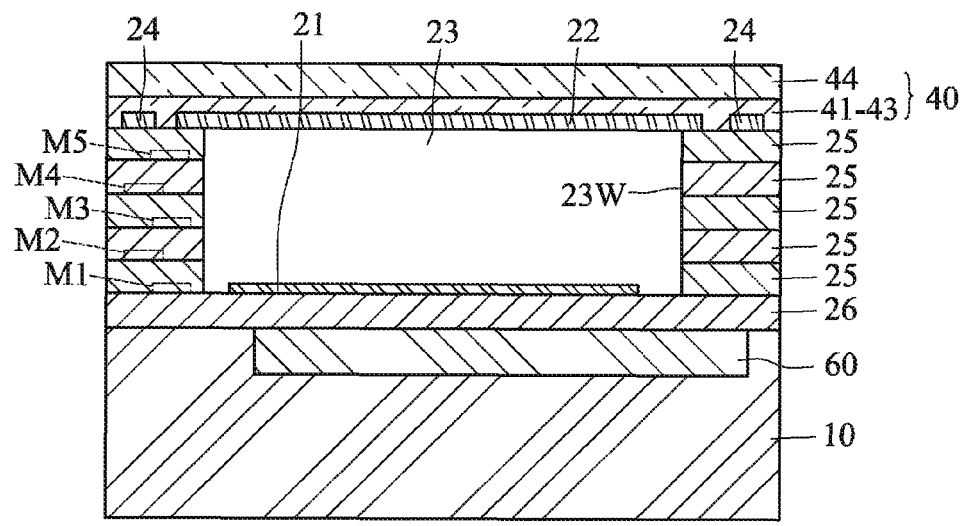
FIG. 3 illustrates a sectional view of the suspended capacitive fingerprint sensor of one embodiment of the instant disclosure.

FIGS. 1 to 3 respectively illustrate a schematic view, a circuit diagram, and a sectional view of a suspended capacitive fingerprint sensor 100 according one embodiment of the instant disclosure. As shown in FIGS. 1 to 3, in this embodiment, the suspended capacitive fingerprint sensor 100 comprises a substrate 10, a plurality of capacitive sensing units 20, and a plurality of operational amplifiers 30.

The capacitive sensing units 20 are on the substrate 10, particularly, the capacitive sensing units 20 may be arranged as arrays. For the sake of clearance, one capacitive sensing unit 20 is shown. Each of the capacitive sensing units 20 comprises a fixed electrode 21, a suspended electrode 22, and a chamber 23 between the fixed electrode 21 and the suspended electrode 22. A sidewall 23W of the chamber 23 is formed by a plurality of dielectric layers 25, and a plurality of conductive layers M1 to M5 is respectively arranged within the dielectric layers 25. To reduce the parasitic capacitance, the conductive layers M1 to M5 may be arranged in the non-sensing region of the capacitive sensing unit 20 or the overlapping area between the suspended electrode 22 and the conductive layers M1 to M5 may be minimized. In the figures, the sidewall 23W is vertical to the surface of the layers, while in some embodiments, the sidewall 23W may be curved; the shape of the sidewall 23W is determined by the etching procedures.

The suspended electrode 22 and a ridge Fr or a valley Fv of a finger form a sensing capacitance Cfinger, the fixed electrode 21 and the suspended electrode 22 form a reference capacitance Cref, and the suspended electrode 22 and one or more conductive material below the suspended electrode 22 form a parasitic capacitance Cp. The extensions of the fixed electrode 21 in the vertical direction is called sensing region, while the rest is called non-sensing region.

The suspended electrode 22 is suspended above the fixed electrode 21, but the suspended electrode 22 is also stationary. The area of the suspended electrode 22 is greater than that of the fixed electrode 21, and a ground electrode 26 which is grounded may be provided to the periphery of the fixed electrode 21 and served as a shielding between the suspended electrode 22 and the circuits of the substrate 10. The conductive layers M1 to M5 in the non-sensing region is mainly provided for connecting the wires of the transistors of the substrate 10, or for meeting the resistance and capacitance characteristics of the sensing circuits.

The operational amplifiers 30 are formed on the substrate 10 and electrically connected to the capacitive sensing units 20, respectively. Each of the operational amplifiers 30 has a positive input end 31, a negative input end 32, and an output end 33. The positive input end 31 is electrically connected to a fixed potential Vref, the negative input end 32 is electrically connected to the suspended electrode 22, an input voltage signal Vin is applied to the finger, and the output end 33 is electrically connected to the fixed electrode 21 and outputs an output voltage Vout. The ideal simplified model of the circuit is represented as Vout=Vin*(Cfinger/Cref).

As described in the following paragraphs, in virtual ground condition, the voltage of the node A equals to Vref. Therefore, if Vref=0, the effect of the parasitic capacitance Cp can be eliminated in the charge conservation condition.

$$Vout*Cref=Vin*Cfinger$$

$$Vout=(Cfinger/Cref)*Vin$$

Originally, insulation materials, e.g., silicon dioxide, are filled between the suspended electrode 22 and the fixed electrode 21, while the dielectric constant of silicon dioxide is about 4 to 5. Therefore, after silicon dioxide is removed, the space between the suspended electrode 22 and the fixed electrode 21 would be filled by air, and the dielectric constant of air is 1. Hence, in an ideal model, Cref is reduced to one-fourth of its original value. Consequently, Vout is increased to four times of its original value. Accordingly, the sensitivity of the suspended capacitive fingerprint sensor can be enhanced, and the effect caused by the parasitic capacitance Cp can be reduced.

In addition, the suspended capacitive fingerprint sensor 100 may further comprise at least one insulation protection layer 40, a switch 50, and a plurality of sensing circuits 60. The insulation protection layer 40 covers the capacitive sensing units 20, so that the finger and the suspended electrode 22 form the sensing capacitance Cfinger above the insulation protection layer 40. Accordingly, the capacitive sensing unit 20 could sense the fingerprint of the finger above the insulation protection layer 40. The material of the insulation protection layer 40 is selected from a group consisting of ceramic material, sapphire material, glass material, and molding compound. The switch 50 is electrically connected between the fixed electrode 21 and the suspended electrode 22 for controlling the charging and discharging of the reference capacitance Cref. Each of the sensing circuits 60 is formed between the substrate 10 and the fixed electrode 21. Each of the sensing circuits 60 has an operational amplifier 30, an analog-to-digital converting circuit, and so forth. In this embodiment, each of the sensing circuits 60 has one or more conductive material provided to form the parasitic capacitance Cp with the suspended electrode 22. In other embodiments, each of the sensing circuits 60 has several conductive materials, and the conductive materials comprise conductive layers M1 to M5 of a layout region 80.

In this embodiment, five conductive layers M1 to M5 are illustrated for an exemplary example. In the non-sensing region, the conductive layers M1 to M5 are served as the layout region 80 for electrical connection and signal transmission; specifically, the fixed electrode 21 and the conductive layer M1 may be the same layer due to parts of the layer is subsequently applied by a patterning procedure to form the fixed electrode 21. The conductive layers M2 to M5 may be called middle conductive layers, and a silicon dioxide insulation layer is formed between each adjacent two conductive layers. It is understood that, one or more of the conductive layers M1 to M5 may be moved; alternatively, a single conductive layer M2, M3, M4 or M5 and a single dielectric layer 25 may achieve the function of the suspended capacitive fingerprint sensor 100 according to embodiments of the instant disclosure. All transistor circuit architectures made by the common CMOS processes are made below the conductive layer M1. The conductive layers M1 to M5 may be provided as wires, capacitance, or even resistance.

In this embodiment, each of the capacitive sensing units 20 further comprises an electrostatic charging loop 24 formed above the substrate 10 and located at the periphery of the corresponding capacitive sensing unit 20, and the electrostatic charging loop 24 is grounded.

Figure 4:
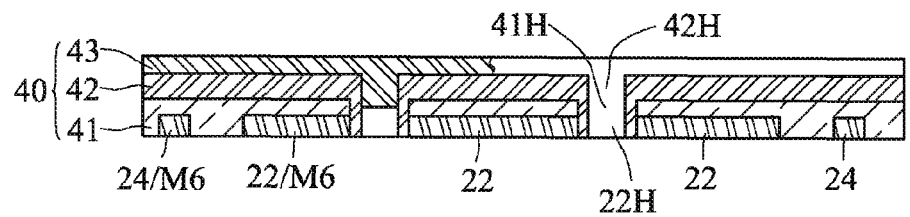
FIG. 4 illustrates a partial enlarged sectional view of the suspended capacitive fingerprint sensor of one embodiment of the instant disclosure.

FIG. 4 illustrates a partial enlarged sectional view of the suspended capacitive fingerprint sensor 100 of one embodiment of the instant disclosure. As shown in FIGS. 3 and 4, the suspended electrode 22 has at least one first via hole 22H communicating with the chamber 23. The first via hole 22H is provided for the subsequent etching procedures. The insulation protection layer 40 comprises a silicon dioxide layer 41, a silicon nitride layer 42, and a material filling layer 43. In addition, the insulation protection layer 40 may further comprise an external protection layer 44 covering the material filling layer 43. The material of the external protection layer 44 may be selected from the group consisting of ceramic material, sapphire material, glass material, and molding compound. Thus, the external protection layer 44 can provide wearing resistive function and protect the chip below the external protection layer 44 from being damaged. It is understood that, for showing the via holes clearly, FIG. 4 illustrates only the left part of the material filling layer 43, while the right part of the material filling layer 43 is omitted.

The silicon dioxide layer 41 covers the suspended electrode 22 and has a second via hole 41H. The second via hole 41H communicates with the first via hole 22H. The silicon nitride layer 42 covers the silicon dioxide layer 41 and has a third via hole 42H. The third via hole 42H communicates with the second via hole 41H. The material filling layer 43 at least covers the silicon nitride layer 42 and fills into the third via hole 42H to seal the chamber 23. As shown in FIG. 4, the material filling layer 43 may be filled to the half height of the second via hole 41H, but embodiments are not limited thereto. In some embodiments, the material filling layer 43 may be filled to the whole height of the first via hole 22H, i.e., the material filling layer may 43 be filled up the first via hole 22.

Figure 5:
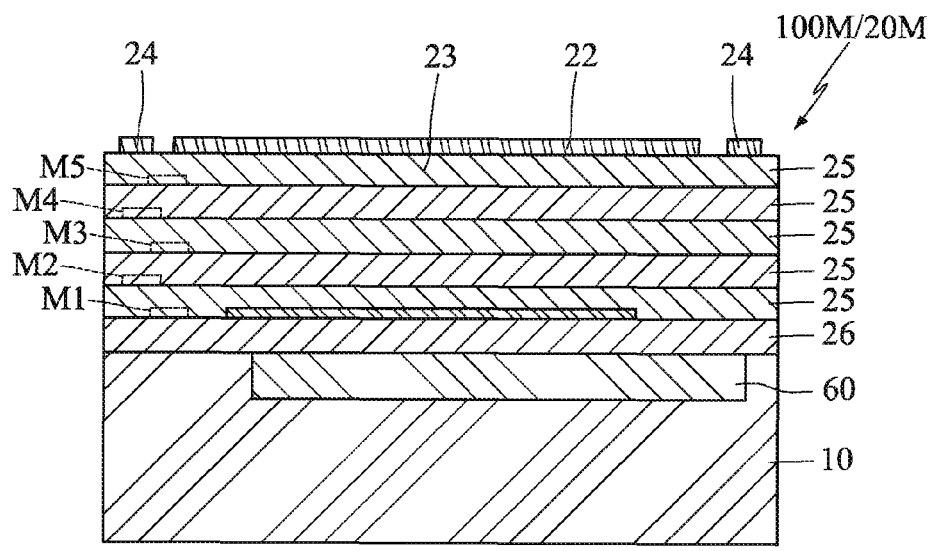
FIG. 5 illustrates a sectional view of a suspended capacitive fingerprint sensor main structure of one embodiment of the instant disclosure.

FIG. 5 illustrates a sectional view of a suspended capacitive fingerprint sensor main structure of one embodiment of the instant disclosure. As shown in FIGS. 3 to 5, one embodiment of the instant disclosure provides a method for manufacturing a suspended capacitive fingerprint sensor 100 comprising following steps. Firstly, a sensor main structure 100M is provided and comprises a substrate 10 and a plurality of capacitive sensing unit main structures 20M on the substrate 10. As shown in FIG. 5 each of the capacitive sensing unit main structures 20M comprises a plurality of dielectric layers 25 and a plurality of conductive layers alternately arranged with the dielectric layers 25. The conductive layers comprise an upper conductive layer M6, a lower conductive layer M1, and several middle conductive layers M2 to M5 between the upper conductive layer M6 and the lower conductive layer M1.

Next, a first via hole 22H is formed on the upper conductive layer M6. And then, a silicon dioxide layer 41 is formed on the upper conductive layer M6. Next, a second via hole 41H is formed on the silicon dioxide layer 41, and the second via hole 41H communicates with the first via hole 22H. And then, a silicon nitride layer 42 is formed on the silicon dioxide layer 41. Next, a third via hole 42H is formed on the silicon nitride layer 42, the third via hole 42H communicates with the second via hole 41H, and the silicon nitride layer 42 is further formed on inner walls of the via holes 22H, 41H, 42H.

And then, etching procedures are (e.g., dry etching) to the dielectric layers 25 through the via holes 22H, 41H, 42H to remove parts of the dielectric layers 25 between the upper conductive layer M6 and the lower conductive layer M1 to form a chamber 23 between the upper conductive layer M6 and the lower conductive layer M1. The chamber 23 may be defined between the conductive layer M6 and one of the conductive layers M1 to M5; in other words, the fixed electrode 21 is not necessarily to belong to the conductive layer M1. As shown in FIG. 3, the portion of the upper conductive layer M6 exposed to the chamber 23 is served as a suspended electrode 22, and the portion of the lower conductive layer M1 exposed to the chamber 23 is to serve as a fixed electrode 21. And then, a material filling layer 43 is covered on the silicon nitride layer 42 and seals the third via hole 42H, as shown in FIG. 4. Finally, an external protection layer 44 may be covered on the material filling layer 43.

Figure 6:
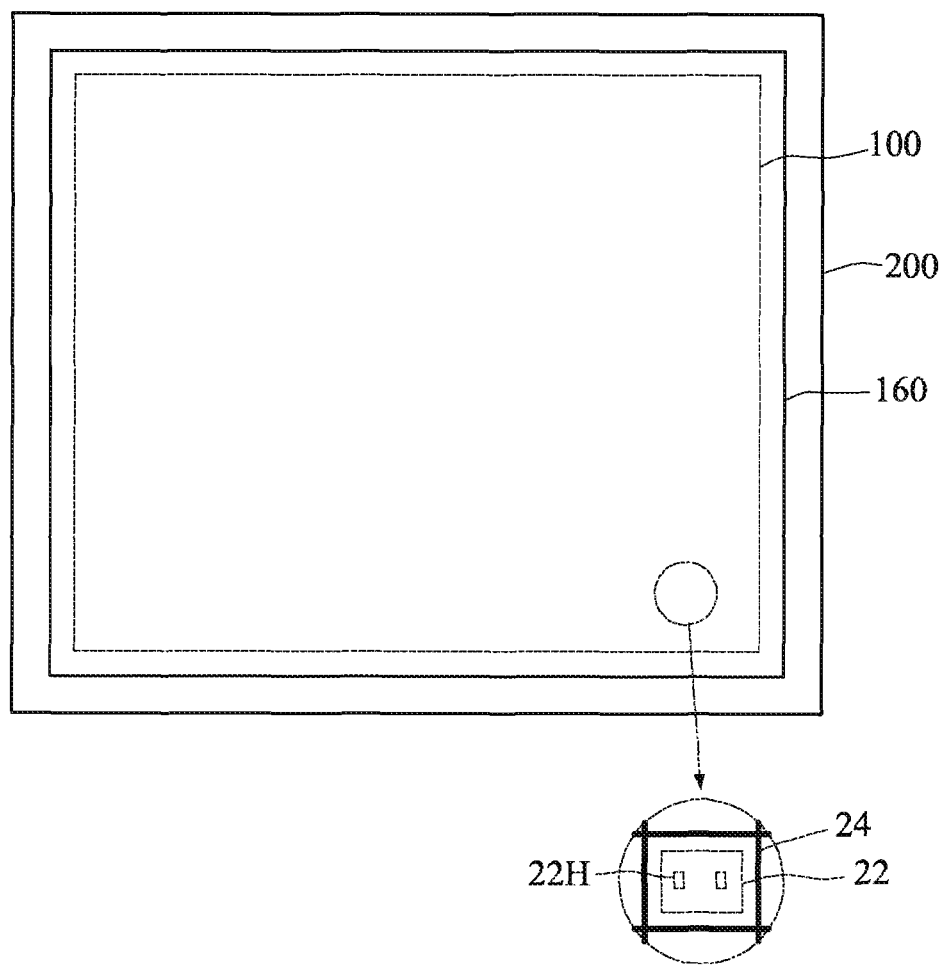
FIG. 6 illustrates top and partial enlarged views of a fingerprint sensor of one embodiment of the instant disclosure.
Figure 7:
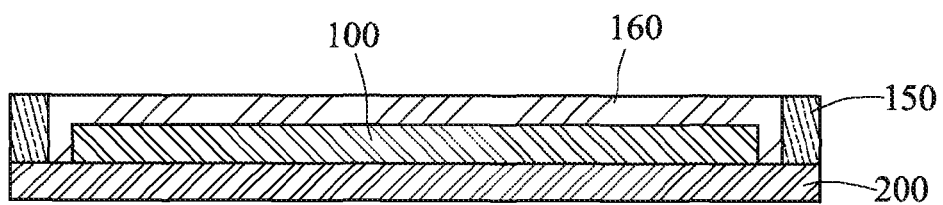
FIG. 7 illustrates a sectional view of a fingerprint sensor of one embodiment of the instant disclosure.

FIG. 6 illustrates top and partial enlarged views of a fingerprint sensor of one embodiment of the instant disclosure. FIG. 7 illustrates a sectional view of a fingerprint sensor of one embodiment of the instant disclosure. As shown in FIGS. 6 and 7, the suspended capacitive fingerprint sensor 100 may be assembled to a printed circuit board 200 and sealed by a molding compound 160. A driving electrode 150 is provided with the periphery of the molding compound 160 for providing driving signals. The suspended electrode 22 may have one, two, or more first via holes 22H. Consequently, an active-type fingerprint sensor can be manufactured accordingly. In some embodiments, a passive-type fingerprint sensor can be manufactured.

Figure 8:
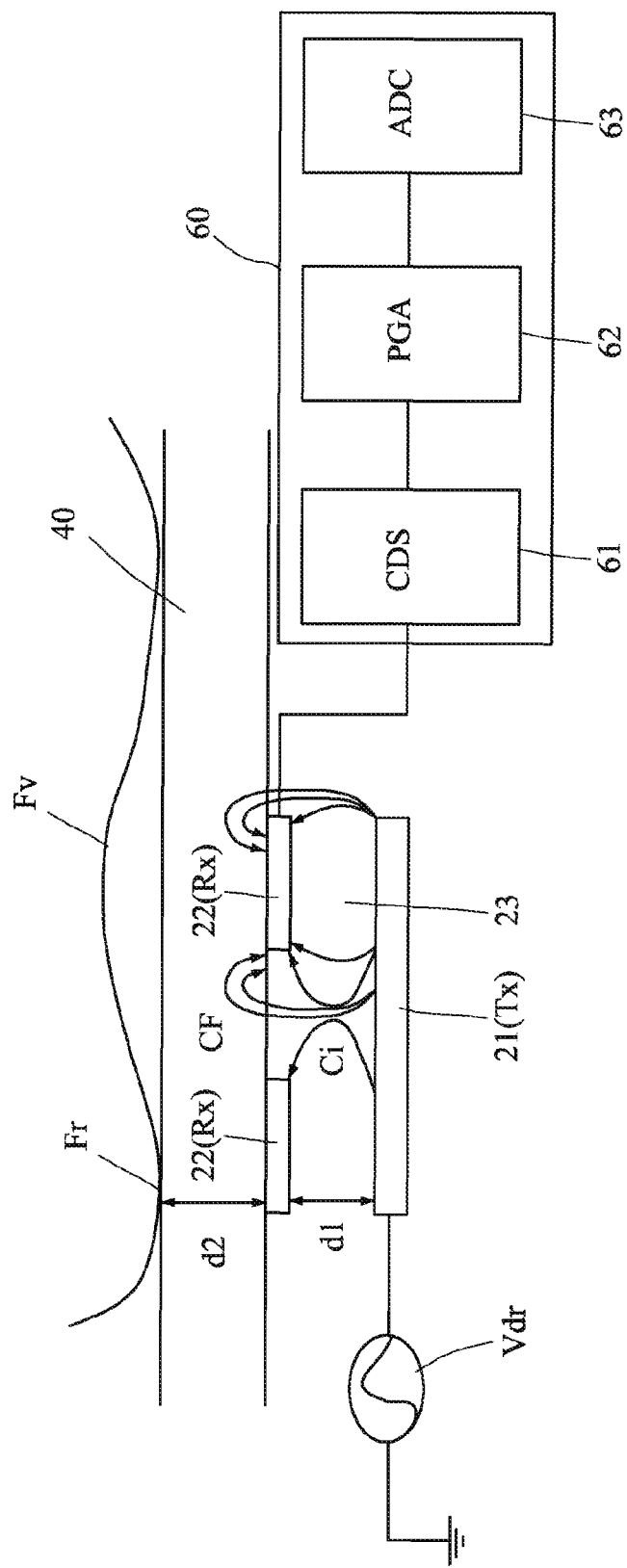
FIG. 8 illustrates a schematic view of a suspended capacitive fingerprint sensor of another embodiment of the instant disclosure.

FIG. 8 illustrates a schematic view of a suspended capacitive fingerprint sensor of another embodiment of the instant disclosure. As shown in FIG. 8, this embodiment is approximately similar to the foregoing embodiments. In this embodiment, a driving signal Vdr is coupled to the fixed electrode 21, so that the fingerprint of the finger can be sensed by the effect of variation of electric filed between the fixed electrode 21 and the suspended electrode 22. Accordingly the capacitive sensing unit senses the fingerprint of the finger above the insulation protection layer 40. The suspended capacitive fingerprint sensor also has a plurality of sensing circuits 60 each formed between the substrate and the fixed electrode 21. The sensing circuits 60 are coupled to the suspended electrode 22 to manipulate an output signal of the suspended electrode 22. The effect of electric field variation is manipulated in a self-capacitance mode or a mutual capacitance mode.

In this embodiment, the fixed electrode 21 is provided as a transmitting electrode Tx, and the suspended electrode 22 is provided as a receiving electrode Rx. After the signal transmitted by the transmitting electrode Tx is received by the receiving electrode Rx, the signal is processed by charge double sampling (CDS), programmable gain amplifier (PAG), and analog to digital converter (ADC), so that the graph showing ridge Fr and valley Fv distributions of the finger can be illustrated. In the condition of the foregoing manufacturing method, the capacitive sensing unit main structure 20M has the sensing circuits 60. When the finger is in contact with the insulation protection layer 40, in the mutual type condition, the density of electric lines between the transmitting electrode Tx and the receiving electrode Rx would be changed. In other words, when the finger is in contact with the insulation protection layer 40, the capacitance Cs (Cs equals to Ci minuses CF) between the transmitting electrode Tx and the receiving electrode Rx would be reduced, where Ci is an initial capacitance of the sensing structure, and CF is the capacitance between finger and suspended electrode 22. Supposed that the driving signal is provided in the same condition, the distance from the transmitting electrode Tx and the end of the finger equals to d1+d2, where d1 and d2 are the thicknesses of the material layers, and the charge can be carried by the finger is the distant maximum charge, i.e., $Q=E(d1+d2)2/K$, where K is the Coulomb constant. From the above equation, the charge is positively proportional to the electric field intensity. In addition, from the Gauss's law, the equation of the electric field intensity with respect to the distance of the finger is $E=Q/(2\pi\in(d1+d2))$, therefore, the electric field intensity is inversely proportional to the dielectric constant $\in$, if d1 corresponds to air, since the dielectric constant of air is less than that of silicon dioxide, the electric field intensity Eair is greater than the electric field intensity $E_{sio_2}$ in the air medium. Accordingly, in the case of the fingerprint sensor having a suspended structure formed between the receiving electrode Rx and the transmitting electrode Tx, the signal intensity of the sensor is greater than that of a fingerprint sensor having silicon dioxide medium.

According to embodiments of the instant disclosure, the internal reference capacitance and the parasitic capacitance are reduced to improve a signal ratio between the sensing capacitance and the reference capacitance, so that the sensing signal can be enhanced. In addition, the intensity of the driving signal of an external or an internal driving source may be increased to further improve the sensing signal. Accordingly, the fingerprint sensor according the embodiment of the instant disclosure can be manufactured by the conventional materials and packaging methods. Moreover, due to the signal intensity of the fingerprint sensor is improved, the sensitivity is acceptable even if the fingerprint recognition chip according to the embodiment of the instant disclosure is assembled below a glass with a thickness of 0.5 to 0.7 mm instead of a thickness of 0.05 to 0.1 mm.

According to the architecture of the embodiment of the instant disclosure, the thickness of the protection layer of the chip can be increased to prevent from specific packaging procedures or to prevent from the use of specific high dielectric constant materials. Hence, the fingerprint sensor can be manufactured by enclosing the chip with conventional and cheap molding compound, so that the thickness of the insulation protection layer can be at least 150 μm or greater when a conventional packaging material or a tempered glass is utilized in the manufacturing of the fingerprint sensor. Alternatively, in the case the intensity of the driving signal of the driving source is increased, the fingerprint chip can be hidden under the touch panel, according to the embodiment of the instant disclosure. Therefore, the capacitive fingerprint sensor can be prevented from being impacted or being worn, and the appearance of the mobile device can be simplified.

Based on the suspended capacitive fingerprint sensor of the embodiment of the instant disclosure, the parasitic capacitance and the reference capacitance are effectively reduced, so that the sensitivity is improved and the thickness of the insulation protection layer can thus be increased. Accordingly, the fingerprint sensor can be protected properly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A suspended capacitive fingerprint sensor comprising:
   a substrate;
   a plurality of capacitive sensing units on the substrate, wherein each of the capacitive sensing units comprises a fixed electrode, a suspended electrode, and a chamber between the fixed electrode and the suspended electrode; and
   at least one insulation protection layer covering the capacitive sensing units, so that the capacitive sensing units sense a fingerprint of a finger above the insulation protection layer, wherein the suspended electrode and a ridge or a valley of the finger form a sensing capacitance Cfinger, the fixed electrode and the suspended electrode form a reference capacitance Cref, and the suspended electrode and one or more conductive material below the suspended electrode from a parasitic capacitance Cp; and
   a plurality of operational amplifiers formed on the substrate, wherein the operational amplifiers are electrically connected to the capacitive sensing units, respectively, each of the operational amplifiers has a positive input end, a negative input end, and an output end, the positive input end is electrically connected to a fixed potential, the negative input end is electrically connected to the suspended electrode, an input voltage signal Vin is applied to the finger, and the output end is electrically connected to the fixed electrode and outputs an output voltage Vout, wherein Vout=Vin*(Cfinger/Cref).

2. The suspended capacitive fingerprint sensor according to claim 1, wherein the suspended electrode has at least one first via hole communicating with the chamber, and wherein the insulation protection layer comprises:
   a silicon dioxide layer covering the suspended electrode, wherein the silicon dioxide layer has a second via hole communicating with the first via hole;
   a silicon nitride layer covering the silicon dioxide layer, wherein the silicon nitride layer has a third via hole communicating with the second via hole;
   a material filling layer covering the silicon nitride layer and is filled in the third via hole to seal the chamber; and an external protection layer covering on the material filling layer, wherein the material of the external protection layer is selected from a group consisting of ceramic material, sapphire material, glass material, and molding compound material.

3. The suspended capacitive fingerprint sensor according to claim 1, further comprising a switch electrically connected between the fixed electrode and the suspended electrode for controlling the charging and discharging of the reference capacitance.

4. The suspended capacitive fingerprint sensor according to claim 1, wherein a ground electrode is disposed at a periphery of the fixed electrode and served as a shielding of the suspended electrode for shielding circuits on the substrate, and wherein the ground electrode is grounded.

5. The suspended capacitive fingerprint sensor according to claim 1, wherein a driving signal is coupled to the fixed electrode to sense the fingerprint of the finger by the effect of electric field variation between the fixed electrode and the suspended electrode, wherein the suspended capacitive fingerprint sensor further comprises a plurality of sensing circuits each formed between the substrate and the fixed electrode, the sensing circuits are coupled to the suspended electrode to manipulate an output signal of the suspended electrode, the effect of electric field variation is manipulated in a self-capacitance mode or a mutual capacitance mode.

6. The suspended capacitive fingerprint sensor according to claim 5, wherein the suspended electrode comprises at least one equal-potential suspended electrode block.

7. A manufacturing method for a suspended capacitive fingerprint sensor, comprising:
  (a) providing a sensor main structure comprising a substrate and a plurality of capacitive sensing unit main structures on the substrate, wherein each of the capacitive sensing unit main structures comprises an operational amplifier, a plurality of dielectric layers, and a plurality of conductive layers, the operational amplifier is formed on the substrate, the conductive layers are respectively arranged within the dielectric layers, the conductive layers comprise an upper conductive layer, a lower conductive layer, and one or more middle conductive layer between the upper conductive layer and the lower conductive layer;
  (b) forming a first via hole on the upper conductive layer;
  (c) forming a silicon dioxide layer on the upper conductive layer;
  (d) forming a second via hole on the silicon dioxide layer, wherein the second via hole communicates with the first via hole;
  (e) forming a silicon nitride layer on the silicon dioxide layer;
  (f) forming a third via hole on the silicon nitride layer; wherein the third via hole communicates with the second via hole, and the silicon nitride layer is further formed on inner walls of the via holes;
  (g) etching the dielectric layers through the via holes to remove parts of the dielectric layers between the upper conductive layer and the lower conductive layer to form a chamber between the upper conductive layer and the lower conductive layer, wherein the portion of the upper conductive layer exposed to the chamber is served as a suspended electrode, and the portion of the lower conductive layer exposed to the chamber is served as a fixed electrode, wherein the suspended electrode and a ridge or a valley of a finger form a sensing capacitance Cfinger, the fixed electrode and the suspended electrode form a reference capacitance Cref, and the suspended electrode and one or more conductive material below the suspended electrode form a parasitic capacitance Cp, wherein each of the operational amplifiers has a positive input end, a negative input end, and an output end, the positive input end is electrically connected to a fixed potential, the negative input end is electrically connected to the suspended electrode, an input voltage signal Vin is applied to the finger, and the output end is electrically connected to the fixed electrode and outputs an output voltage Vout, wherein Vout=Vin*(Cfinger/Cref); and
  (h) covering a material filling layer on the silicon nitride layer, wherein the material filling layer seals the third via hole.

8. The manufacturing method according to claim 7, wherein each of the capacitive sensing unit main structures has a sensing circuit formed on the substrate, wherein a driving signal is coupled to the fixed electrode to sense a fingerprint of a finger by the effect of electric field variation between the fixed electrode and the suspended electrode, wherein the sensing circuits are formed between the substrate and the fixed electrode, the sensing circuits are coupled to the suspended electrode to manipulate an output signal of the suspended electrode.

* * * * *